(12) United States Patent
Gross et al.

(10) Patent No.: US 11,487,640 B2
(45) Date of Patent: Nov. 1, 2022

(54) REPLACING STAIR-STEPPED VALUES IN TIME-SERIES SENSOR SIGNALS WITH INFERENTIAL VALUES TO FACILITATE PROGNOSTIC-SURVEILLANCE OPERATIONS

(71) Applicant: Oracle International Corporation, Redwood Shores, CA (US)

(72) Inventors: Kenny C. Gross, Escondido, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1087 days.

(21) Appl. No.: 16/128,071

(22) Filed: Sep. 11, 2018

(65) Prior Publication Data
US 2020/0081817 A1    Mar. 12, 2020

(51) Int. Cl.
*G06F 11/34*   (2006.01)
*G06N 20/00*   (2019.01)
*G06N 5/04*    (2006.01)
*G06K 9/62*    (2022.01)

(52) U.S. Cl.
CPC ........ *G06F 11/3495* (2013.01); *G06K 9/6267* (2013.01); *G06K 9/6298* (2013.01); *G06N 5/04* (2013.01); *G06N 20/00* (2019.01)

(58) Field of Classification Search
CPC ...... G06F 11/3495; G06N 20/00; G06N 5/04; G06K 9/6267; G06K 9/6298
USPC ......................................................... 706/12
See application file for complete search history.

(56) References Cited

U.S. PATENT DOCUMENTS

| | | | | |
|---|---|---|---|---|
| 8,620,591 B2* | 12/2013 | Wegerich | ............. | A61B 5/0205 703/11 |
| 8,775,427 B2* | 7/2014 | Birdwell | ............. | G06F 16/2453 707/737 |
| 2019/0378022 A1* | 12/2019 | Wang | ....................... | G06N 5/04 |

OTHER PUBLICATIONS

Lepot, "Interpolation in Time Series: An Introductive Overview of Existing Methods, Their Performance Criteria and Uncertainty Assessment", 2017, Retrieved from www.mdpi.com/journal/water, pp. 1-20 (Year: 2017).*

(Continued)

*Primary Examiner* — Ted T. Vo
(74) *Attorney, Agent, or Firm* — Park, Vaughan, Fleming & Dowler LLP

(57) ABSTRACT

During operation, the system obtains the time-series sensor signals, which were gathered from sensors in a monitored system. Next, the system classifies the time-series sensor signals into stair-stepped signals and un-stair-stepped signals. The system then replaces stair-stepped values in the stair-stepped signals with interpolated values determined from un-stair-stepped values in the stair-stepped signals. Next, the system divides the time-series sensor data into a training set and an estimation set. The system then trains an inferential model on the training set, and uses the trained inferential model to replace interpolated values in the estimation set with inferential estimates. Next, the system switches roles of the training and estimation sets to produce a new training set and a new estimation set. The system then trains the inferential model on the new training set, and uses the trained inferential model to replace interpolated values in the new estimation set with inferential estimates.

20 Claims, 5 Drawing Sheets

(56) References Cited

OTHER PUBLICATIONS

Uhrig et al., "Computational Intelligence in Nuclear Engineering", 2005, Nuclear Engineering and Technology, vol. 37, No. 2, pp. 127-138. (Year: 2005).*
Hines, "Improved Method for On-Line Sensor Calibration Verification", 2000, ASME, American Society of Mechanical Engineers, 9 pages. (Year: 2000).*
Buza, "Time Series Classification and its Applications", 2018, ACM, 4 pages. (Year: 2018).*

* cited by examiner

REPLACING STAIR-STEPPED VALUES IN TIME-SERIES SENSOR SIGNALS WITH INFERENTIAL VALUES TO FACILITATE PROGNOSTIC-SURVEILLANCE OPERATIONS

BACKGROUND

Field

The disclosed embodiments generally relate to techniques for performing prognostic-surveillance operations in monitored systems based on time-series sensor signals. More specifically, the disclosed embodiments relate to a technique for replacing stair-stepped values in time-series sensor signals with more accurate inferential values to facilitate prognostic-surveillance operations.

Related Art

Large numbers of sensors are presently being deployed to perform "prognostic surveillance" operations to monitor the operational health of critical assets in monitored systems. For example, a medium-sized computer data center can include over 1,000,000 sensors monitoring thousands of business-critical servers, a modern passenger jet can include 75,000 sensors, and an oil refinery can include over 1,000,000 sensors. These sensors produce large volumes of time-series sensor data, which can be used to perform prognostic-surveillance operations for the systems. These prognostic-surveillance operations make it possible to detect incipient anomalies that arise during operation of a monitored system, wherein the incipient anomalies can provide early warning about an impending failure of the monitored system.

In monitored systems, it is common for sensors measuring different parameters (e.g., temperatures, voltages, currents, fan speeds, vibration levels, rotation speeds for rotating machinery, etc.) to be sampled at different sampling rates (e.g., 10 samples per second, once per second, once per minute, once per 15 minutes, etc.) However, prognostic-surveillance operations, which often use machine-learning techniques, cannot operate using signals with different sampling rates. For this reason, it has become common for commercial "data historian" software systems to use "stair-stepping" to create uniform sampling rates for all time-series signals. Stair-stepping is a simple technique, wherein low sampling rate signals simply repeat their last measured value at a higher sampling rate, so that all of the resulting time-series signals have the same uniform sampling rate. This causes signals from lower sampling rate sensors to include sequences of flat segments, which resemble stair steps.

Unfortunately, stair-stepped time-series signals have poor cross-correlation with other signals and consequently perform poorly when used for prognostic-surveillance purposes. Moreover, poor correlation is not significantly improved by using interpolation (instead of stair-stepping) to fill in missing values in low sampling-rate sensor signals, because interpolated values similarly provide poor cross-correlation with other signals.

Hence, what is needed is a technique for filling in missing values in low sampling rate sensor signals without the above-described disadvantages of using stair-stepping and interpolation techniques.

SUMMARY

The disclosed embodiments provide a system that pre-processes time-series sensor signals to facilitate prognostic-surveillance operations. During operation, the system obtains the time-series sensor signals, which were gathered from sensors in a monitored system during operation of the monitored system. Next, the system classifies the time-series sensor signals into stair-stepped signals and un-stair-stepped signals. The system then performs an interpolation operation to replace stair-stepped values in the stair-stepped signals with interpolated values determined from un-stair-stepped values in the stair-stepped signals. Next, the system divides the time-series sensor data into a training set and an estimation set. The system then trains an inferential model on the training set, and uses the trained inferential model to replace interpolated values in the estimation set with corresponding inferential estimates. Next, the system switches roles of the training and estimation sets to produce a new training set and a new estimation set. The system then trains the inferential model on the new training set, and uses the trained inferential model to replace interpolated values in the new estimation set with corresponding inferential estimates. Finally, the system combines the training and estimation sets to produce preprocessed time-series sensor data, wherein stair-stepped values are replaced with inferential estimates.

In some embodiments, prior to combining the training and estimation sets, the system further refines the inferential estimates by performing the following sequence of operations one or more times. The system first trains the inferential model on the training set, and uses the trained inferential model to replace inferential estimates in the estimation set with new inferential estimates. Next, the system switches roles of the training and estimation sets to produce a new training set and a new estimation set. Finally, the system trains the inferential model on the new training set, and uses the trained inferential model to replace inferential estimates in the new estimation set with new inferential estimates.

In some embodiments, classifying the time-series sensor signals involves using a first-order derivate to classify the time-series sensor signals as either stair-stepped signals or un-stair-stepped signals.

In some embodiments, performing the interpolation operation involves using straight-line interpolation.

In some embodiments, performing the interpolation operation involves using cubic-spline interpolation.

In some embodiments, the inferential model comprises a Multivariate State Estimation Technique (MSET) model.

In some embodiments, the system subsequently trains a prognostic inferential model for a prognostic pattern-recognition system based on the preprocessed time-series sensor data. Next, during a surveillance mode for the prognostic pattern-recognition system, the system receives subsequently generated time-series sensor data containing actual values from the monitored system. The system then uses the prognostic inferential model to generate estimated values for the subsequently generated time-series sensor data. Next, the system performs a pairwise differencing operation between the actual values and the estimated values for the subsequently generated time-series sensor data to produce residuals. The system then performs a sequential probability ratio test (SPRT) on the residuals to detect incipient anomalies that arise during operation of the monitored system.

In some embodiments, receiving the subsequently generated time-series sensor data involves preprocessing the subsequently generated time-series sensor data to replace stair-stepped values with inferential estimates prior to using the prognostic inferential model to generate the estimated values for the subsequently generated time-series sensor data.

In some embodiments, the incipient anomalies comprise indicators of an impending failure of the monitored system or a sensor degradation event.

In some embodiments, while obtaining the time-series sensor data, the system initially receives the time-series sensor signals during operation of the monitored system. Next, the system upsamples lower sampling rate signals in the time-series sensor signals by repeating the last measured sensor values at a higher sampling rate, so that all of the time-series signals have a uniform higher sampling rate. The system then stores the time-series sensor data in a time-series database. Finally, the system retrieves the stored time-series sensor data from the time-series database.

DETAILED DESCRIPTION

Figure 1:
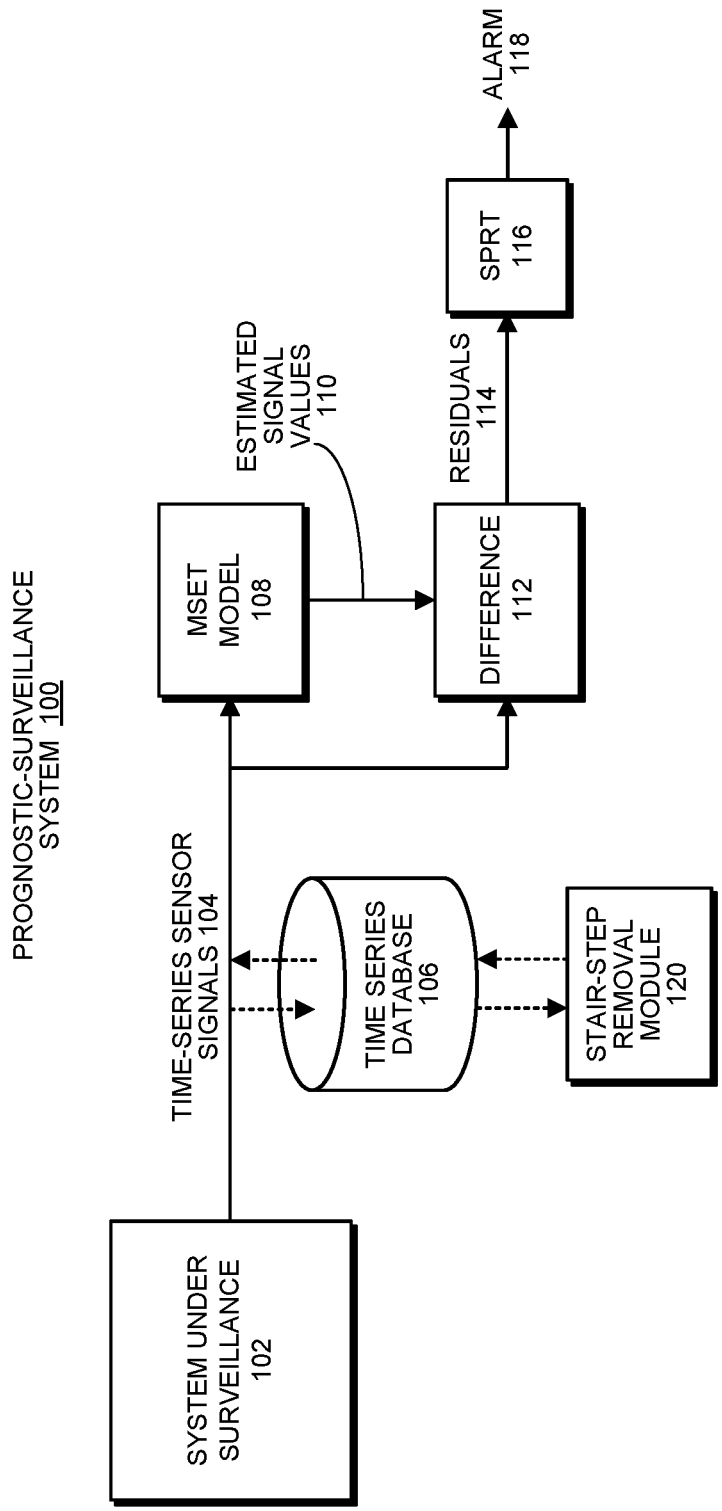
FIG. 1 illustrates an exemplary prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Sensor sampling rates can vary widely for a variety of historical reasons, as well as for physics-related reasons and bandwidth-related reasons. Historical reasons include the fact that some components or systems have historically polled their internal sensors at a fixed sampling rate (e.g., once per 10 seconds, once per minute, etc.). For reasons of cost, system manufacturers are unlikely to modify system hardware and firmware or the system bus, even though data scientists often desire higher sampling rates.

In many cases, the data busses that transfer sensor signals have long ago become international standards, for which no individual companies possess the power to change. For example, computer data centers typically use the Inter-Integrated Circuit (I2C) system bus to bring time-series sensor signals out of enterprise servers and storage systems. The I2C standard evolved 20 years ago from television technology, and all computer hardware vendors have adopted the I2C standard. Otherwise, the computer hardware vendors would not be able to use commodity internal components, such as power supplies, capacitors, memory, disk drives, etc. Note that the I2C standard provides very little bandwidth. Moreover, at present no one server vendor has the clout to change the standard. If a server vendor wants to use a different standard, they would have to incur exorbitant costs to procure customized internal components, which would have to be custom-made to conform to a non-standard bus architecture. Hence, because the bandwidth for telemetry signals from servers is fixed, and is unlikely to change in the foreseeable future, when "important" sensors have higher sampling rates, less-critical sensors have to get slower sampling rates to avoid saturation of the I2C system bus.

The "physics reasons" for variable sampling rates arise from the inherent "inertia" of specific system parameters. For some parameters with high inertia, it makes no sense to provision high sampling rates. Consider the example of a massive object with a high thermal inertia and a multi-second time-constant for thermal changes. In this example, it would not make sense to poll the thermal sensors at a multi-Hertz sampling rate because the thermal inertia ensures that the temperature of the object will not change that quickly.

For the above-mentioned reasons, the sampling rates for sensors in industrial assets are rarely uniform. However, for machine learning (ML) prognostics no existing ML technique can consume data with non-uniform sampling rates. It has become common practice to remedy this problem by filling in missing values in lower sampling rate signals using a technique called "stair-stepping." Stair-stepping is a crude technique for creating uniform sampling rates, which operates as follows. If Sensor-A is sampled once per second, and Sensor-B is sampled once per minute, then Data Historian software simply repeats each measurement for Sensor-B 59 times and generates associated once-per-second timestamps with "flat" repeated measurements. (Hence, the name "stair-stepping" because the low sampling rate signals tend to look like sequences of stair steps.) Note that the artificially generated flat portion of the stair-stepped signals does not contribute to the accuracy of prognostic-surveillance operations for the monitored assets.

Moreover, stair-stepped signals are problematic for sophisticated ML techniques. All types of ML (e.g., neural networks, support vector machines, kernel regression, and Oracle's MSET) use advanced pattern recognition techniques to learn the patterns of correlation among monitored signals. When an advanced ML technique is being "trained" to learn that some signals have dynamic content related to system performance, but other signals have a stilted response with 59/60 values in the above example being perfectly flat, then the ML technique performs poorly while detecting the onset of subtle developing faults.

Exemplary Prognostic-Surveillance System

The above-described stair-step removal technique can be used to facilitate downstream prognostic-surveillance operations involving time-series signals from the sensors. These prognostic-surveillance operations can use MSET, which is able to predict what each signal in a set of correlated time-series signals "should be" on the basis of learned correlation patterns. While analyzing new values, MSET creates an "estimate" for each value, and then compares this estimate with a corresponding real measured value using a binary hypothesis test called the Sequential Probability Ratio Test (SPRT) to detect anomalies associated with the new values.

For example, FIG. 1 illustrates an exemplary prognostic-surveillance system 100 that makes use of a time-series database 106, which contains time-series signals obtained from sensors in accordance with the disclosed embodiments. As illustrated in FIG. 1, prognostic-surveillance system 100 operates on a set of time-series signals 104 obtained from sensors in a system under surveillance 102. Note that the system under surveillance 102 can generally include any type of machinery or facility, which includes sensors and generates time-series signals. Moreover, time-series signals 104 can originate from any type of sensor, which can be located in a component in the system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so that such problems can be avoided or proactively fixed.

Prognostic-surveillance system 100 also includes a stair-step removal module 120, which replaces stair-stepped values in low sampling rate signals with more accurate inferential values as is described in more detail below.

Process of Removing Stair-Steps

Figure 2:
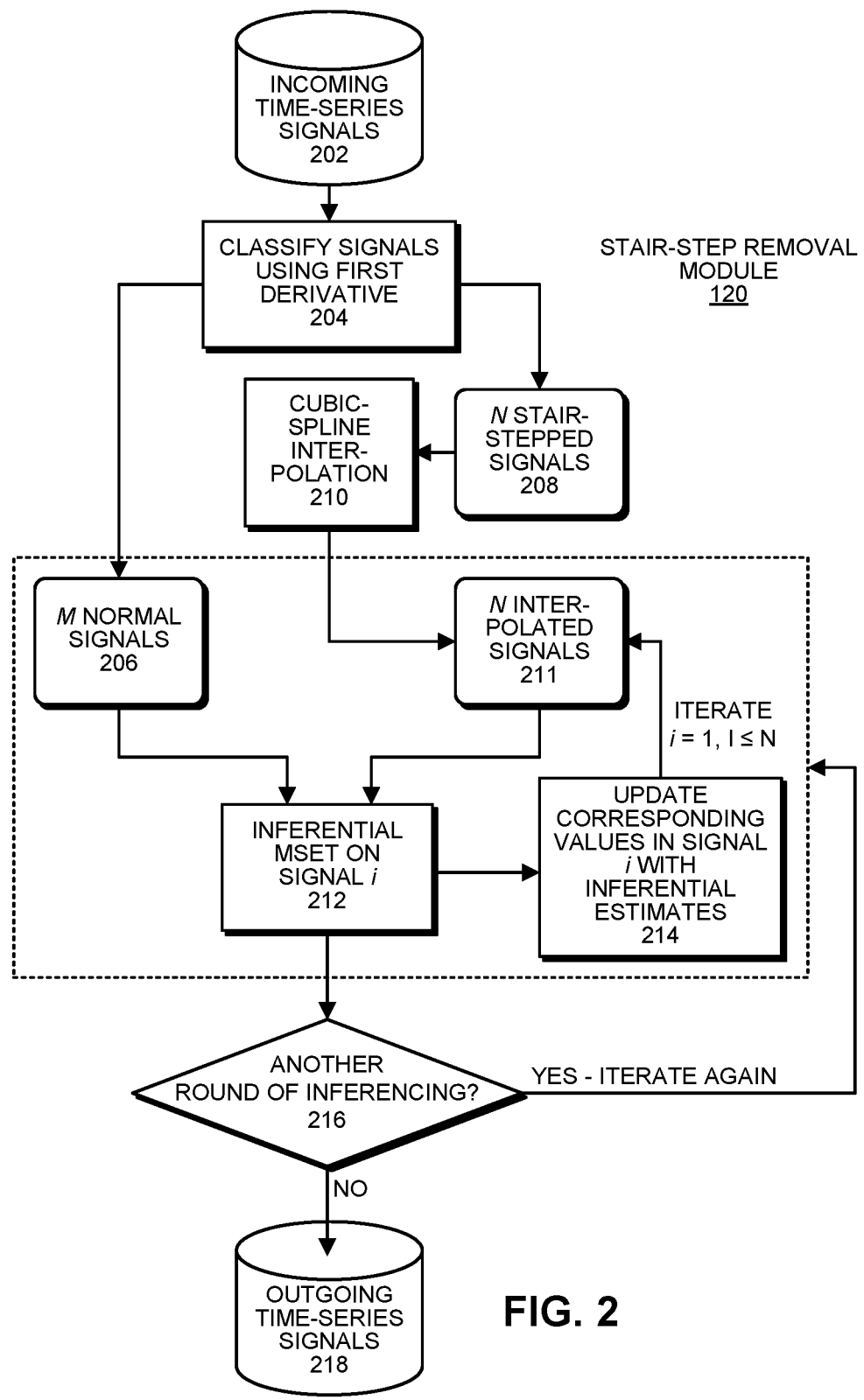
FIG. 2 illustrates the structure of a stair-step removal module in accordance with the disclosed embodiments.

FIG. 2 illustrates how a two-pass stair-step inferencing technique (which is performed by stair-step-removal module 120) operates in accordance with the described embodiments. The system begins by receiving incoming time-series signals 202, which include M normal high-sampling-rate signals with no stair steps 206, and N lower-sampling-rate, stair-stepped (SS) signals 208. Note that the incoming time-series signals 202 are first classified by applying a first-order derivative to all signals so that the N SS signals are automatically identified and captured. The first value of each stair step is then preserved while the rest of the flat stair values are temporarily removed.

The system then performs a two-state (inner iteration) technique, which is embedded in an M-stage (outer iteration) loop, which starts with "interpolation" shape functions for the stair-stepped segments, and then through a systematic iterative process, incrementally improves the interpolates, value-by-value and signal-by-signal, so that the end result is a set of time-series sensor signals that possess nearly the same prognostic information content as if all sensors had been sampled at the same high sampling rates.

During the first iteration, the removed SS values in the N SS signals 208 are temporarily substituted with interpolated values to produce N interpolated signals 211. To improve the shape of the interconnection between the last effective observation point and next effective observation point, we can replace those removed points using cubic-spline interpolation 210. This yields a better correlation structure for later inferencing operations versus purely flat stair steps during training of the pattern-recognition technique.

Next, the system performs an inferential MSET operation on each signal i 212 to infer replacements for the interpolated values in the signal i. The system then updates the corresponding values in signal i with inferential estimates 214. Note that this process iterates over all N interpolated signals. At the end of this process, the system determines whether another round of inferencing is required (step 216). If so (YES at step 216), the system iterates the inferencing process again to further refine the inferential estimates. Otherwise (NO at step 216), the system outputs the preprocessed outgoing time-series signals 218.

During operation, the inferential estimation process uses the first half of input signals to infer the second half of an SS signal, and then takes the second half of input signals to infer the first half of the SS signal. Note that if we use all of the SS signals at the same time for the inferencing, accuracy could be degraded. Hence, we employ the two-pass inferencing process, which is described in more detail below with reference to the flow that appears in FIG. 4

As an example, suppose there exist N=10 SS signals within a larger collection of time-series signals containing higher sampling-rate signals. In the first pass, we begin by applying inferential MSET (iMSET) to the first SS signal (SS1) using M normal signals and the remaining nine SS signals. (iMSET is an innovation previously developed by the inventors, which infers one signal with very high accuracy from a collection of correlated signals. Please see U.S. Pat. No. 7,292,952, entitled "Replacing a Signal from a Failed Sensor in a Computer System with an Estimated Signal Derived from Correlations with Other Signals," by inventors Kenny C. Gross, et al., filed 3 Feb. 2004. Also see, pending U.S. patent application Ser. No. 15/601,766, entitled "Self-Optimizing Inferential-Sensing Technique to Optimize Deployment of Sensors in a Computer System," by inventors Kenny C. Gross, et al., filed on 22 May 2017. These patent documents are hereby incorporated by reference.) Note that the first iMSET inferenced signal (IS1) will be the least accurate of the inferenced signals, because when it gets inferenced, the other nine SS signals are less accurate because they still include cubic-spline interpolated values.

The system then iterates this process over all of the other SS signals, wherein subsequent output IS signals will become incrementally more accurate because they are inferenced using fewer SS signals that still have cubic-spline interpolation. By the time the system has inferenced the SS10 signal, the SS10 signal is the most accurate because it uses all other nine inferenced signals during its inferencing.

To address the fact that the IS1 signal was the least accurate, we can perform a second pass, which involves performing another round of iterations to further refine the inferencing for IS1. Note that IS1 will become much more accurate because at this point the other signals IS2-IS10 are all more accurate than the previous time through the first iteration. During this second pass, we inference all of the other IS signals again until IS10 is inferenced again. Now the IS1-IS10 signals will be significantly more accurate than the IS signals produced during the first pass, and much more accurate than the original interpolated signals.

Figure 3:
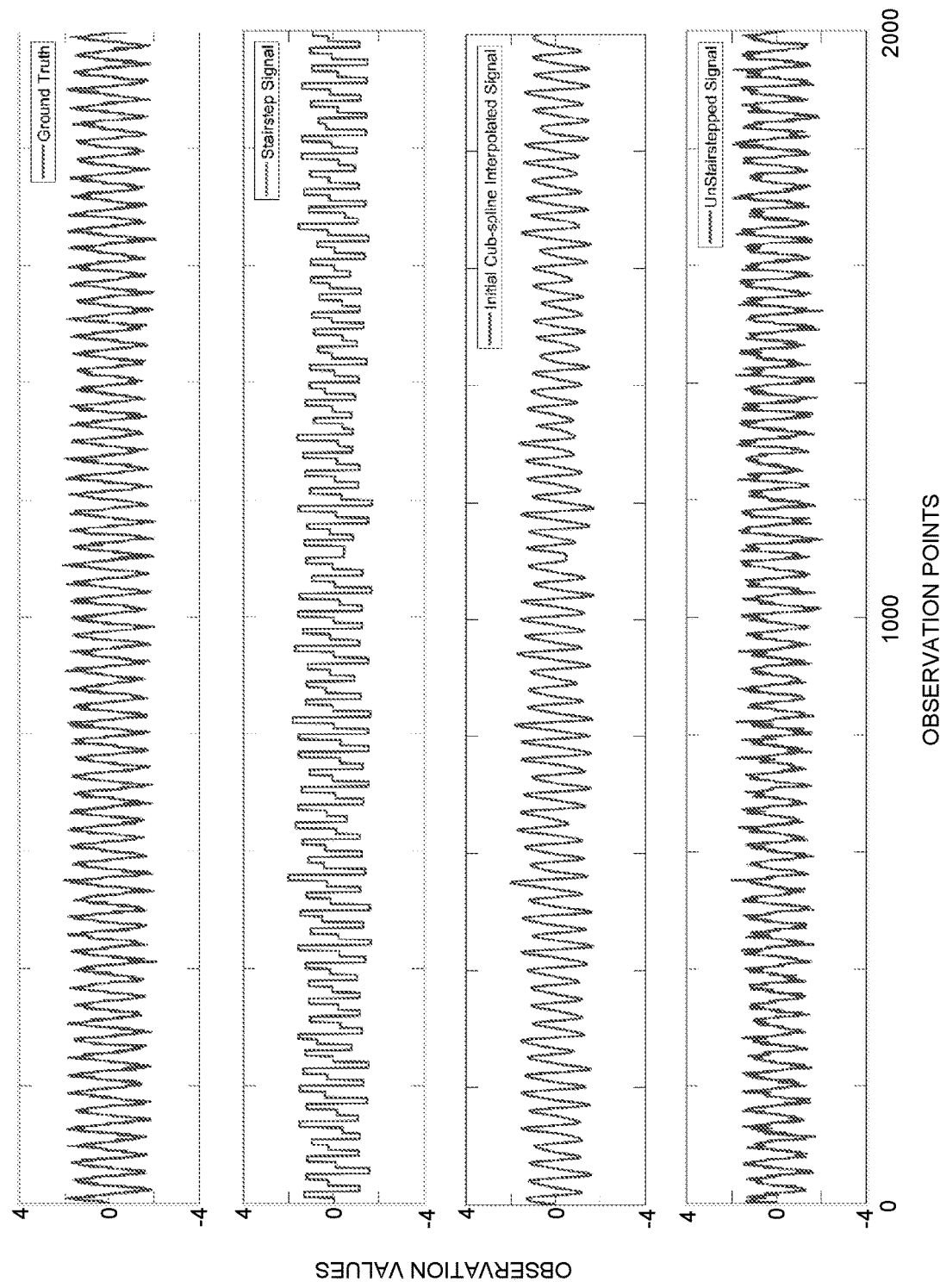
FIG. 3 presents graphs illustrating upsampled time-series signals produced using cubic-spline interpolation and an inferential stair-stepping removal technique in accordance with the disclosed embodiments.

FIG. 3 presents four graphs illustrating the performance of the proposed two-pass, dual-loop, stair-step inferencing technique against conventional cubic spline interpolation. The first and second graphs (from top to bottom) in FIG. 3 show the ground truth and stair-stepped signals, respectively. The third graph illustrates the performance of conventional cubic spline interpolation. Note that this interpolated signal preserves the shape of the ground truth signal better than the stair-stepped signal. In contrast, the bottom plot in FIG. 3 shows the resulting un-stair-stepped signal after the two passes of inferencing are performed. Note that this un-stair-stepped signal not only preserves the shape, but also the stochastic content of the ground truth signal. Overall, the un-stair-stepped signal exhibits extremely good alignment with the corresponding ground truth signal.

Summary of Stair-Step Removal Process

Figure 4:
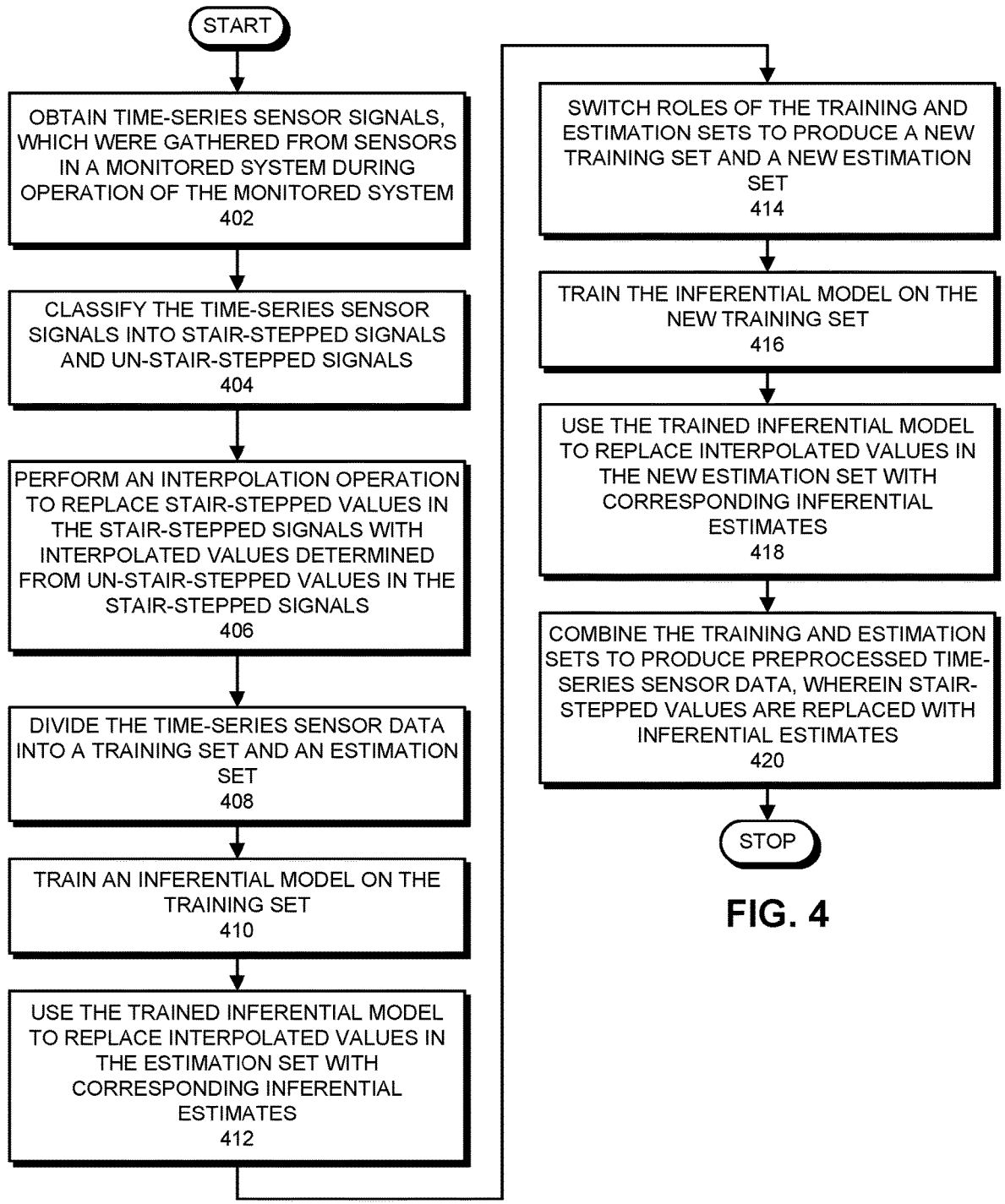
FIG. 4 presents a flow chart illustrating a technique for preprocessing time-series sensor signals to facilitate subsequent prognostic-surveillance operations in accordance with the disclosed embodiments.

FIG. 4 presents a flow chart illustrating our technique for preprocessing time-series sensor signals to remove stair-stepped values in accordance with the disclosed embodiments. During operation, the system obtains time-series sensor signals, which were gathered from sensors in a monitored system during operation of the monitored system (step 402). Next, the system classifies the time-series sensor signals into stair-stepped signals and un-stair-stepped signals (step 404). The system then performs an interpolation operation to replace stair-stepped values in the stair-stepped signals with interpolated values determined from un-stair-stepped values in the stair-stepped signals (step 406). Next, the system divides the time-series sensor data into a training set and an estimation set (step 408). The system then trains an inferential model on the training set (step 410), and uses the trained inferential model to replace interpolated values in the estimation set with corresponding inferential estimates (step 412). Next, the system switches roles of the training and estimation sets to produce a new training set and a new estimation set (step 414). The system then trains the inferential model on the new training set (step 416), and uses the trained inferential model to replace interpolated values in the new estimation set with corresponding inferential estimates (step 418). Finally, the system combines the training and estimation sets to produce preprocessed time-series sensor data, wherein stair-stepped values are replaced with inferential estimates (step 420).

Figure 5:
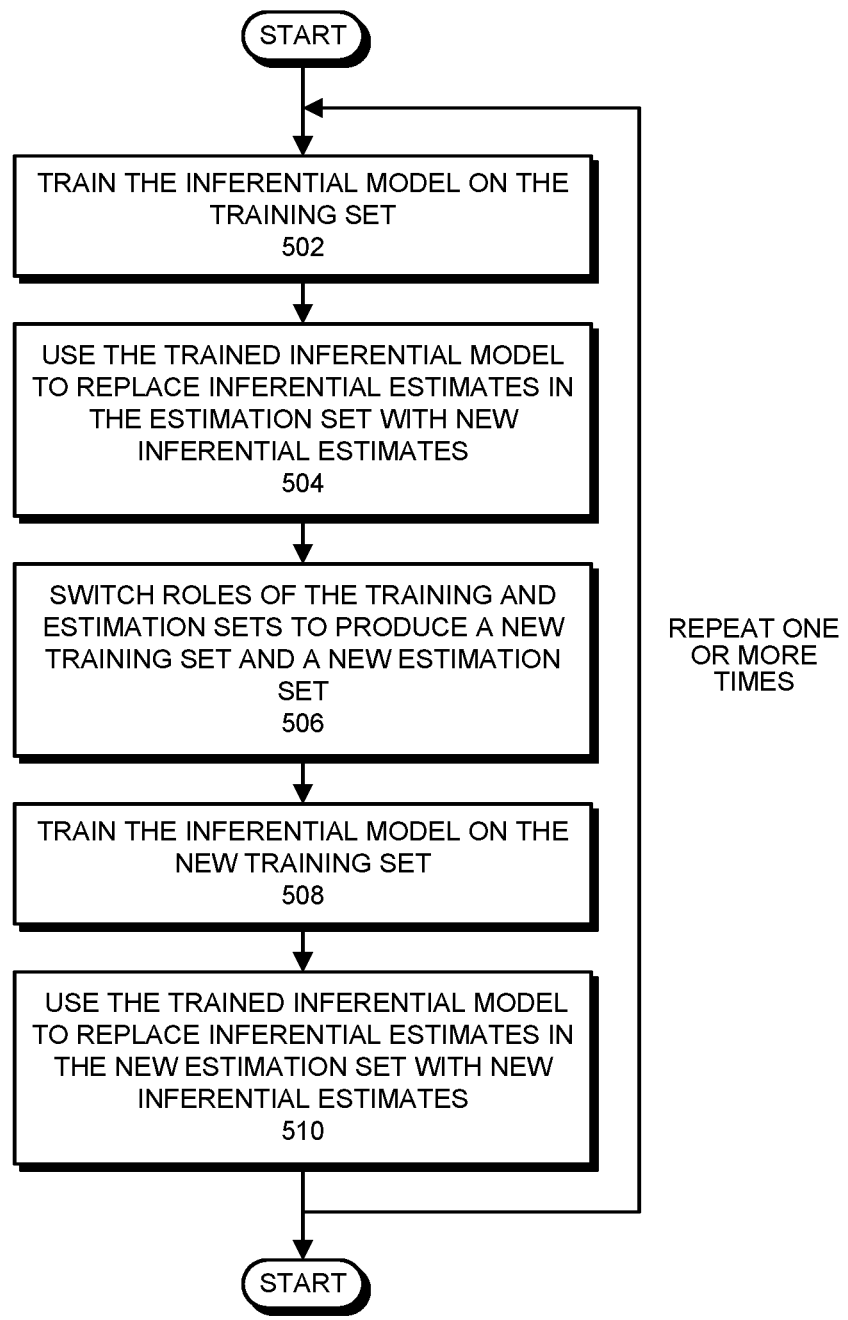
FIG. 5 presents a flow chart illustrating operations involved in further refining inferential estimates in low sampling rate signals in accordance with the disclosed embodiments.

FIG. 5 presents a flow chart illustrating the process of further refining inferential estimates in low sampling rate signals in accordance with the disclosed embodiments. This process involves performing the following sequence of operations one or more times. The system first trains the inferential model on the training set (step 502), and uses the trained inferential model to replace inferential estimates in the estimation set with new inferential estimates (step 504). Next, the system switches roles of the training and estimation sets to produce a new training set and a new estimation set (step 506). Then, the system trains the inferential model on the new training set (step 508), and uses the trained inferential model to replace inferential estimates in the new estimation set with new inferential estimates (step 510).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for preprocessing time-series sensor signals to facilitate prognostic-surveillance operations, comprising:
    obtaining the time-series sensor signals, which were gathered from sensors in a monitored system during operation of the monitored system, wherein obtaining the time-series sensor data comprises:
        initially receiving the time-series sensor signals during operation of the monitored system;
        up-sampling lower sampling rate signals in the time-series sensor signals by repeating last measured sensor values at a higher sampling rate, so that all of the time-series signals have a uniform higher sampling rate;
        storing the time-series sensor data in a time-series database; and
        subsequently retrieving the time-series sensor data from the time-series database;
    classifying the time-series sensor signals into stair-stepped signals and un-stair-stepped signals;
    performing an interpolation operation to replace stair-stepped values in the stair-stepped signals with interpolated values determined from un-stair-stepped values in the stair-stepped signals; and
    using an inferential model to replace the interpolated values with inferential estimates determined based on correlations among the time-series sensor signals.

2. The method of claim 1, wherein using an inferential model to replace the interpolated values with the inferential estimates comprises:
- dividing the time-series sensor data into a training set and an estimation set;
- training an inferential model on the training set;
- using the trained inferential model to replace interpolated values in the estimation set with corresponding inferential estimates;
- switching roles of the training and estimation sets to produce a new training set and a new estimation set;
- training the inferential model on the new training set;
- using the trained inferential model to replace interpolated values in the new estimation set with corresponding inferential estimates; and
- combining the training and estimation sets to produce preprocessed time-series sensor data, wherein stair-stepped values are replaced with inferential estimates.

3. The method of claim 2, wherein prior to combining the training and estimation sets, the method further refines the inferential estimates by performing the following operations one or more times:
- training the inferential model on the training set;
- using the trained inferential model to replace inferential estimates in the estimation set with new inferential estimates;
- switching roles of the training and estimation sets to produce a new training set and a new estimation set;
- training the inferential model on the new training set; and
- using the trained inferential model to replace inferential estimates in the new estimation set with new inferential estimates.

4. The method of claim 1, wherein classifying the time-series sensor signals involves using a first-order derivate to classify the time-series sensor signals as either stair-stepped signals or un-stair-stepped signals.

5. The method of claim 1, wherein performing the interpolation operation involves using one of straight-line interpolation and cubic-spline interpolation.

6. The method of claim 1, wherein the inferential model comprises a Multivariate State Estimation Technique (MSET) model.

7. The method of claim 1, wherein the method further comprises:
- training a prognostic inferential model for a prognostic pattern-recognition system based on the preprocessed time-series sensor data; and
- during a surveillance mode for the prognostic pattern-recognition system,
  - receiving subsequently generated time-series sensor data containing actual values from the monitored system,
  - using the prognostic inferential model to generate estimated values for the subsequently generated time-series sensor data,
  - performing a pairwise differencing operation between the actual values and the estimated values for the subsequently generated time-series sensor data to produce residuals, and
  - performing a sequential probability ratio test (SPRT) on the residuals to detect incipient anomalies that arise during operation of the monitored system.

8. The method of claim 7, wherein receiving the subsequently generated time-series sensor data involves preprocessing the subsequently generated time-series sensor data to replace stair-stepped values with inferential estimates prior to using the prognostic inferential model to generate the estimated values for the subsequently generated time-series sensor data.

9. The method of claim 7, wherein the incipient anomalies comprise indicators of an impending failure of the monitored system or a sensor degradation event.

10. A non-transitory, computer-readable storage medium storing instructions that when executed by a computer cause the computer to perform a method for preprocessing time-series sensor signals to facilitate prognostic-surveillance operations, the method comprising:
- obtaining the time-series sensor signals, which were gathered from sensors in a monitored system during operation of the monitored system, wherein obtaining the time-series sensor data comprises:
  - initially receiving the time-series sensor signals during operation of the monitored system;
  - up-sampling lower sampling rate signals in the time-series sensor signals by repeating last measured sensor values at a higher sampling rate, so that all of the time-series signals have a uniform higher sampling rate;
  - storing the time-series sensor data in a time-series database; and
  - subsequently retrieving the time-series sensor data from the time-series database;
- classifying the time-series sensor signals into stair-stepped signals and un-stair-stepped signals;
- performing an interpolation operation to replace stair-stepped values in the stair-stepped signals with interpolated values determined from un-stair-stepped values in the stair-stepped signals; and
- using an inferential model to replace the interpolated values with inferential estimates determined based on correlations among the time-series sensor signals.

11. The non-transitory, computer-readable storage medium of claim 10, wherein using an inferential model to replace the interpolated values with the inferential estimates comprises:
- dividing the time-series sensor data into a training set and an estimation set;
- training an inferential model on the training set;
- using the trained inferential model to replace interpolated values in the estimation set with corresponding inferential estimates;
- switching roles of the training and estimation sets to produce a new training set and a new estimation set;
- training the inferential model on the new training set;
- using the trained inferential model to replace interpolated values in the new estimation set with corresponding inferential estimates; and
- combining the training and estimation sets to produce preprocessed time-series sensor data, wherein stair-stepped values are replaced with inferential estimates.

12. The non-transitory, computer-readable storage medium of claim 11, wherein prior to combining the training and estimation sets, the method further refines the inferential estimates by performing the following operations one or more times:
- training the inferential model on the training set;
- using the trained inferential model to replace inferential estimates in the estimation set with new inferential estimates;
- switching roles of the training and estimation sets to produce a new training set and a new estimation set;
- training the inferential model on the new training set; and using the trained inferential model to replace inferential estimates in the new estimation set with new inferential estimates.

13. The non-transitory, computer-readable storage medium of claim 10, wherein classifying the time-series sensor signals involves using a first-order derivate to classify the time-series sensor signals as either stair-stepped signals or un-stair-stepped signals.

14. The non-transitory, computer-readable storage medium of claim 10, wherein the method further comprises:
training a prognostic inferential model for a prognostic pattern-recognition system based on the preprocessed time-series sensor data; and
during a surveillance mode for the prognostic pattern-recognition system,
receiving subsequently generated time-series sensor data containing actual values from the monitored system,
using the prognostic inferential model to generate estimated values for the subsequently generated time-series sensor data,
performing a pairwise differencing operation between the actual values and the estimated values for the subsequently generated time-series sensor data to produce residuals, and
performing a sequential probability ratio test (SPRT) on the residuals to detect incipient anomalies that arise during operation of the monitored system.

15. The non-transitory, computer-readable storage medium of claim 14, wherein receiving the subsequently generated time-series sensor data involves preprocessing the subsequently generated time-series sensor data to replace stair-stepped values with inferential estimates prior to using the prognostic inferential model to generate the estimated values for the subsequently generated time-series sensor data.

16. A system that preprocesses time-series sensor signals to facilitate subsequent prognostic-surveillance operations, comprising:
at least one processor and at least one associated memory; and
a preprocessor that executes on the at least one processor, wherein during operation, the preprocessor:
obtains the time-series sensor signals, which were gathered from sensors in a monitored system during operation of the monitored system, wherein obtaining the time-series sensor data comprises:
initially receiving the time-series sensor signals during operation of the monitored system;
up-sampling lower sampling rate signals in the time-series sensor signals by repeating last measured sensor values at a higher sampling rate, so that all of the time-series signals have a uniform higher sampling rate;
storing the time-series sensor data in a time-series database; and
subsequently retrieving the time-series sensor data from the time-series database;
classifies the time-series sensor signals into stair-stepped signals and un-stair-stepped signals;
performs an interpolation operation to replace stair-stepped values in the stair-stepped signals with interpolated values determined from un-stair-stepped values in the stair-stepped signals; and
uses an inferential model to replace the interpolated values with inferential estimates determined based on correlations among the time-series sensor signals.

17. The system of claim 16, wherein while using the inferential model to replace the interpolated values with the inferential estimates, the preprocessor:
divides the time-series sensor data into a training set and an estimation set;
trains an inferential model on the training set;
uses the trained inferential model to replace interpolated values in the estimation set with corresponding inferential estimates;
switches roles of the training and estimation sets to produce a new training set and a new estimation set;
trains the inferential model on the new training set;
uses the trained inferential model to replace interpolated values in the new estimation set with corresponding inferential estimates; and
combines the training and estimation sets to produce preprocessed time-series sensor data, wherein stair-stepped values are replaced with inferential estimates.

18. The system of claim 17, wherein prior to combining the training and estimation sets, the preprocessor further refines the inferential estimates by performing the following operations one or more times:
training the inferential model on the training set;
using the trained inferential model to replace inferential estimates in the estimation set with new inferential estimates;
switching roles of the training and estimation sets to produce a new training set and a new estimation set;
training the inferential model on the new training set; and
using the trained inferential model to replace inferential estimates in the new estimation set with new inferential estimates.

19. The system of claim 16, wherein classifying the time-series sensor signals involves using a first-order derivate to classify the time-series sensor signals as either stair-stepped signals or un-stair-stepped signals.

20. The system of claim 16, wherein performing the interpolation operation involves using one of straight-line interpolation and cubic-spline interpolation.

* * * * *